United States Patent
Edler et al.

(10) Patent No.: US 8,919,114 B2
(45) Date of Patent: Dec. 30, 2014

(54) CLOSED-LOOP HYDRAULIC SYSTEM HAVING PRIORITY-BASED SHARING

(75) Inventors: Brad A. Edler, Waterloo, IL (US); Jeffrey L. Kuehn, Metamora, IL (US); Jeremy T. Peterson, Washington, IL (US); Michael T. Verkuilen, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 686 days.

(21) Appl. No.: 13/278,479

(22) Filed: Oct. 21, 2011

(65) Prior Publication Data

US 2013/0098010 A1 Apr. 25, 2013

(51) Int. Cl.
*F16D 31/02* (2006.01)
*F15B 7/00* (2006.01)
*E02F 9/22* (2006.01)
*F15B 11/17* (2006.01)

(52) U.S. Cl.
CPC .............. *F15B 7/003* (2013.01); *E02F 9/2289* (2013.01); *E02F 9/2292* (2013.01); *E02F 9/2296* (2013.01); *F15B 7/006* (2013.01); *F15B 11/17* (2013.01); *E02F 9/2228* (2013.01); *F15B 2211/20546* (2013.01); *F15B 2211/20576* (2013.01); *F15B 2211/30595* (2013.01); *F15B 2211/3144* (2013.01); *F15B 2211/613* (2013.01); *F15B 2211/6346* (2013.01); *F15B 2211/7142* (2013.01); *F15B 2211/781* (2013.01); *F15B 2211/785* (2013.01)
USPC ..................... 60/422; 60/424; 60/484; 60/486

(58) Field of Classification Search
USPC ............ 60/421, 422, 424, 429, 468, 484, 486
See application file for complete search history.

(56) References Cited

U.S. PATENT DOCUMENTS

| | | |
|---|---|---|
| 4,369,625 A | 1/1983 | Izumi et al. |
| 4,449,366 A | 5/1984 | Sato et al. |

(Continued)

FOREIGN PATENT DOCUMENTS

| | | |
|---|---|---|
| EP | 076485 B1 | 1/1986 |
| EP | 1 598 561 | 11/2005 |

(Continued)

OTHER PUBLICATIONS

Linjama, M. (2011) entitled "Digital Fluid Power-State of the Art", The 12th Scandinavian International Conference on Fluid Power, May 18-20, 2011 Tampere, Finland.

(Continued)

*Primary Examiner* — Michael Leslie
(74) *Attorney, Agent, or Firm* — Finnegan, Henderson, Farabow, Garrett & Dunner LLP (57) ABSTRACT

A hydraulic system is disclosed having first, second, and third pumps. The hydraulic system may also have a first actuator connected to the first pump in closed-loop manner, a second actuator connected to the second pump in closed-loop manner, and a third actuator. The hydraulic system may further have a selector valve associated with the third pump, and a first switching valve associated with the third pump and the third actuator. The first switching valve may be movable between a first position at which the third pump is connected to the third actuator in a closed-loop manner to move the third actuator in a first direction, a second position at which the third pump is connected to the third actuator in a closed-loop manner to move the third actuator in a second direction, and a third position at which the third pump is connected to the selector valve.

20 Claims, 3 Drawing Sheets

(56) References Cited

U.S. PATENT DOCUMENTS

| | | | |
|---|---|---|---|
| 4,561,249 | A | 12/1985 | Watanabe et al. |
| 4,586,330 | A | 5/1986 | Watanabe et al. |
| 4,768,339 | A | 9/1988 | Aoyagi et al. |
| 4,833,798 | A | 5/1989 | Ehrich |
| 5,048,293 | A | 9/1991 | Aoyagi |
| 5,329,767 | A | 7/1994 | Hewett |
| 6,330,797 | B1 | 12/2001 | Kondo |
| 6,745,992 | B2 | 6/2004 | Yang et al. |
| 6,789,335 | B1 | 9/2004 | Kinugawa et al. |
| 6,918,247 | B1 | 7/2005 | Warner |
| 7,243,591 | B2 | 7/2007 | Dixen et al. |
| 7,260,931 | B2 | 8/2007 | Egelja et al. |
| 7,272,928 | B2 | 9/2007 | Ariga et al. |
| 7,412,827 | B2 | 8/2008 | Verkuilen |
| 7,434,391 | B2 | 10/2008 | Asam et al. |
| 7,490,421 | B1 | 2/2009 | Pletzer et al. |
| 7,516,613 | B2 | 4/2009 | Kadlicko |
| 2004/0083629 | A1 | 5/2004 | Kondou |
| 2004/0123499 | A1 | 7/2004 | Arii |
| 2005/0012337 | A1 | 1/2005 | Yoshimatsu |
| 2005/0036894 | A1 | 2/2005 | Oguri |
| 2007/0044463 | A1 | 3/2007 | VerKuilen et al. |
| 2008/0250783 | A1 | 10/2008 | Griswold |
| 2008/0300757 | A1 | 12/2008 | Kanayama et al. |
| 2008/0314038 | A1 | 12/2008 | Tozawa et al. |
| 2009/0165450 | A1 | 7/2009 | Cherney et al. |
| 2009/0288408 | A1 | 11/2009 | Tozawa et al. |
| 2010/0000209 | A1 | 1/2010 | Wada et al. |
| 2010/0000211 | A1 | 1/2010 | Ikeda et al. |
| 2010/0043420 | A1 | 2/2010 | Ikeda et al. |
| 2010/0107620 | A1 | 5/2010 | Nelson et al. |
| 2010/0115936 | A1 | 5/2010 | Williamson et al. |
| 2010/0162593 | A1 | 7/2010 | Hughes, IV et al. |
| 2010/0162885 | A1 | 7/2010 | Hughes, IV et al. |
| 2010/0163258 | A1 | 7/2010 | Hughes, IV et al. |
| 2010/0218493 | A1 | 9/2010 | Nakamura et al. |
| 2010/0236232 | A1 | 9/2010 | Boehm et al. |
| 2011/0029206 | A1 | 2/2011 | Kang et al. |
| 2011/0030364 | A1 | 2/2011 | Persson et al. |
| 2011/0056194 | A1 | 3/2011 | Wojcicki et al. |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., "Hybrid Displacement Controlled Multi-Actuator Hydraulic Systems", The Twelfth Scandinavian International Conference on Fluid Power, Tampere, Finland (May 18-20, 2011).

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic and pneumatic 20 (1976) Nr. 4.

CLOSED-LOOP HYDRAULIC SYSTEM HAVING PRIORITY-BASED SHARING

TECHNICAL FIELD

The present disclosure relates generally to a hydraulic system and, more particularly, to a closed-loop hydraulic system having priority-based sharing between circuits.

BACKGROUND

A conventional open-loop hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a closed-loop hydraulic system. A closed-loop hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A closed-loop hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and little or no throttling of a fluid flow is required.

An exemplary closed-loop hydraulic system is disclosed in U.S. Patent Publication 2008/0250785 of Griswold that published on Oct. 16, 2008 (the '785 publication). In the '785 publication, a multi-actuator hydraulic system is described that has flow combining functionality. The hydraulic system includes a first circuit having a first hydraulic actuator connected to a first pump in a closed-loop manner, and a second circuit having a second hydraulic actuator connected to a second pump in a closed manner. The hydraulic system also includes a third pump connected in an open-loop manner to the first and second circuits to provide additional flow to the first and second circuits.

Although an improvement over existing meterless hydraulic systems, the meterless hydraulic system of the '785 publication described above may still be less than optimal. In particular, because the third pump is connected to the first and second circuits in an open-loop manner, excessive losses may still be realized.

The hydraulic system of the present disclosure is directed toward solving one or more of the problems set forth above and/or other problems of the prior art.

SUMMARY

In one aspect, the present disclosure is directed to a hydraulic system. The hydraulic system may include a first pump, a second pump, and a third pump. The hydraulic system may also include a first actuator connected to the first pump in closed-loop manner, a second actuator connected to the second pump in closed-loop manner, and a third actuator. The hydraulic system may further include a selector valve associated with the third pump, and a first switching valve associated with the third pump and the third actuator. The first switching valve may be movable between a first position at which the third pump is connected to the third actuator in a closed-loop manner to move the third actuator in a first direction, a second position at which the third pump is connected to the third actuator in a closed-loop manner to move the third actuator in a second direction, and a third position at which the third pump is connected to the selector valve.

In another aspect, the present disclosure is directed to a method of operating a hydraulic system. The method may include pressurizing fluid with a first pump, and directing pressurized fluid from the first pump to a first actuator via a closed-loop first circuit. The method may also include pressurizing fluid with a second pump, and directing pressurized fluid from the second pump to a second actuator via a closed-loop second circuit. The method may further include pressurizing fluid with a third pump, and selectively directing pressurized fluid from the third pump through a third actuator to the first or second circuits via a closed-loop third circuit, or directing pressurized fluid from the third pump to bypass the third actuator and enter the first or second circuits via the third circuit.

DETAILED DESCRIPTION

Figure 1:
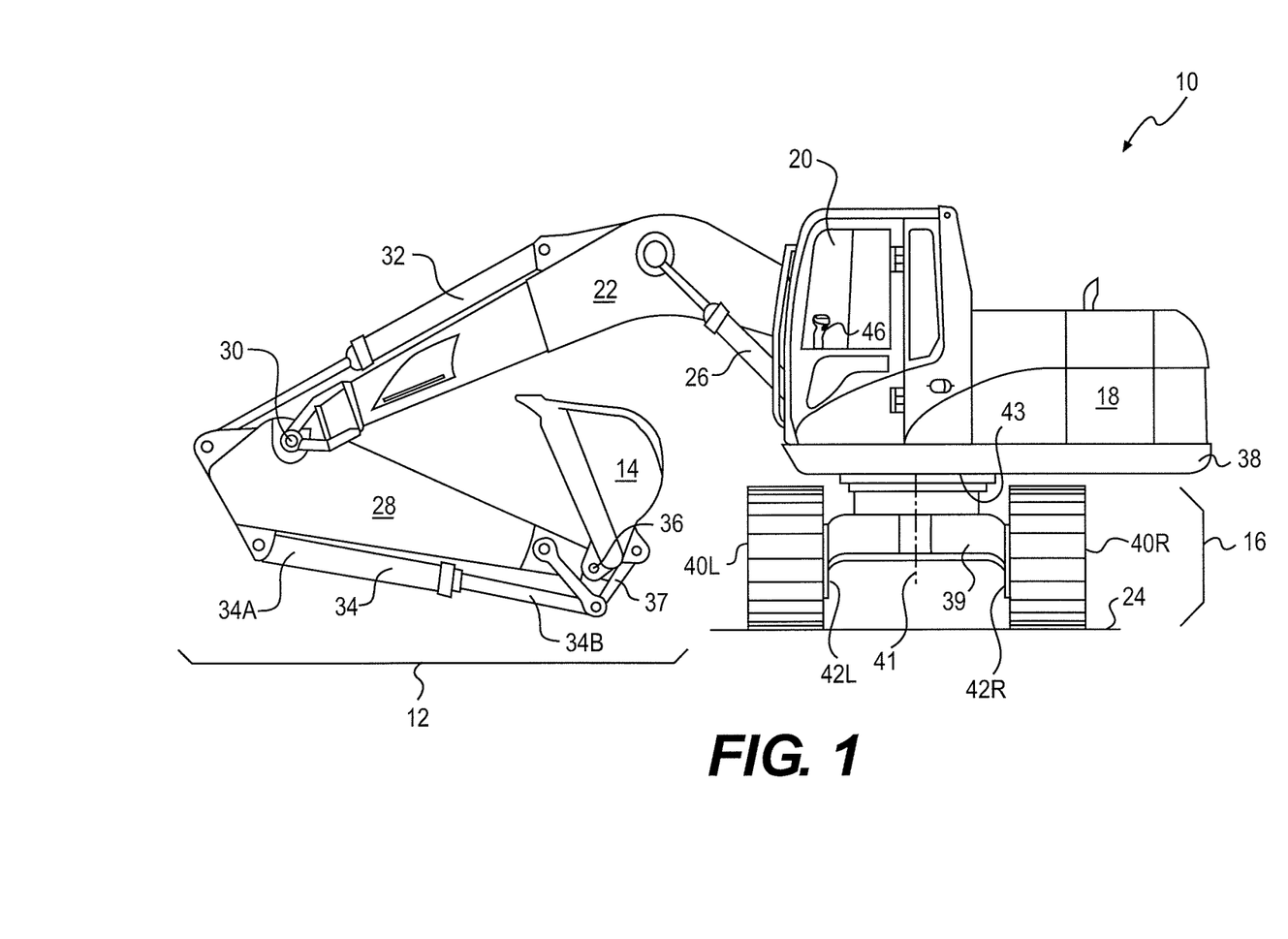
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or another earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by linear and rotary fluid actuators to move work tool 14. For example, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected at a base end to a body 38 of machine 10. Body 38 may be connected to an undercarriage 39 and caused to swing about a vertical axis 41 by a hydraulic swing motor 43. Stick 28 may pivotally connect a distal end of boom 22 to work tool 14 by way of axes 30 and 36.

Numerous different work tools 14 may be attachable to a single machine 10 and operator controllable. Work tool 14 may include any device used to perform a particular task such as, for example, a bucket (shown in FIG. 1), a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction about pivot axis 41, work tool 14 may alternatively or additionally rotate relative to stick 28, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks, such as wheels, belts, or other known traction devices. Machine 10 may be steered by generating a speed and/or rotational direction difference between left and right travel motors 42L, 42R, while straight travel may be facilitated by generating substantially equal output speeds and rotational directions of left and right travel motors 42L, 42R.

Power source 18 may embody an engine such as, for example, a diesel engine, a gasoline engine, a gaseous fuel-powered engine, or another type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving the linear and rotary actuators of implement system 12.

Operator station 20 may include devices that receive input from a machine operator indicative of desired maneuvering. Specifically, operator station 20 may include one or more operator interface devices 46, for example a joystick (shown in FIG. 1), a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
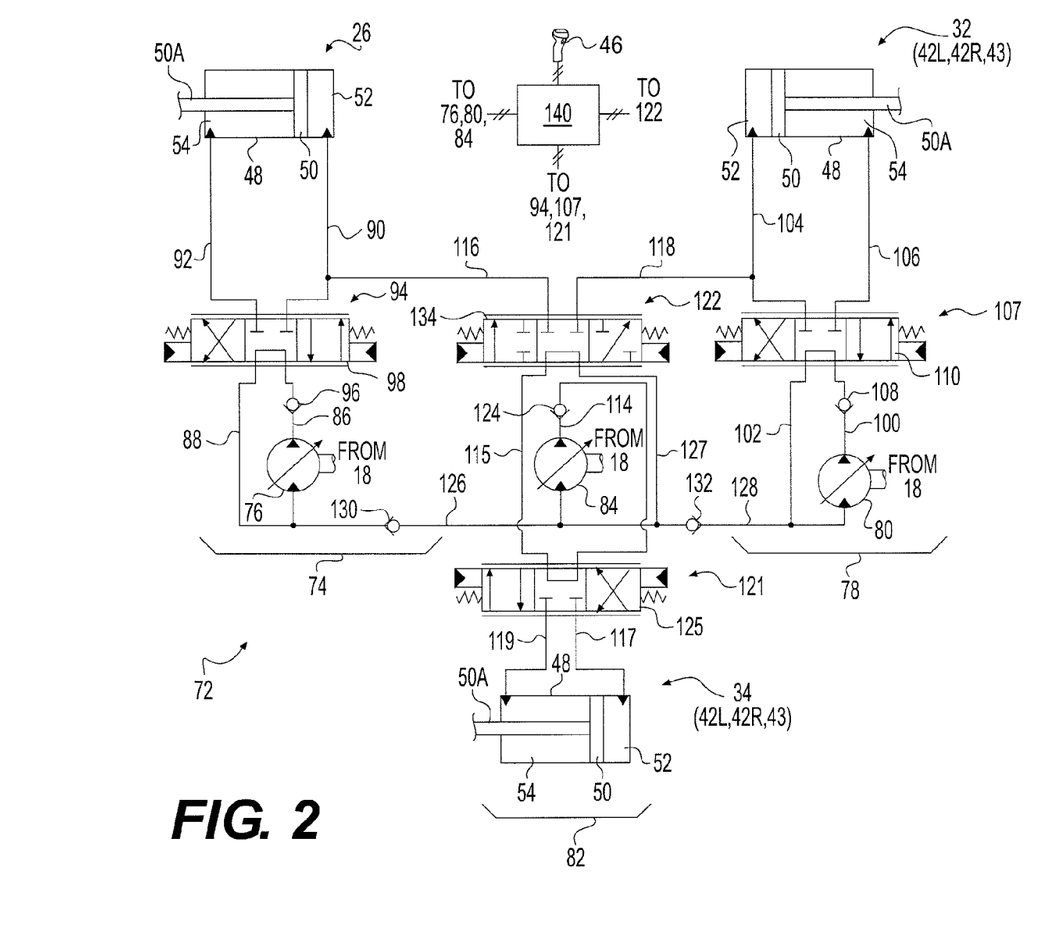
FIG. 2 is a schematic illustration of an exemplary disclosed hydraulic system that may be used in conjunction with the machine of FIG. 1.

Three exemplary hydraulic actuators are shown in the schematic of FIG. 2. It should be noted that, while only three linear actuators are shown, the depicted actuators may represent any one or more of the linear actuators (e.g., hydraulic cylinders 26, 32, 34) or the rotary actuators (left travel, right travel, or swing motors 42L, 42R, 43) of machine 10.

The hydraulic actuators, if embodied as linear actuators, may each include a tube 48 and a piston assembly 50 arranged within tube 48 to form a first chamber 52 and an opposing second chamber 54. In one example, a rod portion 50A of piston assembly 50 may extend through an end of second chamber 54. As such, each second chamber 54 may be considered the rod-end chamber of the respective actuator, while each first chamber 52 may be considered the head-end chamber. First and second chambers 52, 54 of each hydraulic actuator may be selectively supplied with pressurized fluid from one or more pumps and drained of the pressurized fluid to cause piston assembly 50 to displace within tube 48, thereby changing the effective length of the actuator to move work tool 14. A flow rate of fluid into and out of first and second chambers 52, 54 may relate to a translational velocity of each actuator, while a pressure differential between first and second chambers 52, 54 may relate to a force imparted by each actuator on work tool 14.

The hydraulic actuators, if embodied as rotary actuators, may function in a similar manner. That is, each rotary actuator may also include first and second chambers located to either side of a pumping mechanism such as an impeller, plunger, or series of pistons. When the first chamber is filled with pressurized fluid from one or more pumps and the second chamber is simultaneously drained of fluid, the pumping mechanism may be urged to rotate in a first direction by a pressure differential across the pumping mechanism. Conversely, when the first chamber is drained of fluid and the second chamber is simultaneously filled with pressurized fluid, the pumping mechanism may be urged to rotate in an opposite direction by the pressure differential. The flow rate of fluid into and out of the first and second chambers may determine a rotational velocity of each actuator, while a magnitude of the pressure differential across the pumping mechanism may determine an output torque. The rotary actuators could be fixed- or variable-displacement type motors, as desired.

Machine 10 may include a hydraulic system 72 having a plurality of fluid components that cooperate with the hydraulic actuators to move work tool 14 and machine 10. In particular, hydraulic system 72 may include, among other things, a closed-loop first circuit 74 fluidly connecting a first pump 76 with a first hydraulic actuator (e.g., hydraulic cylinder 26 associated with movement of boom 22) of machine 10, a closed-loop second circuit 78 fluidly connecting a second pump 80 with a second hydraulic actuator (e.g., hydraulic cylinder 32 associated with movement of stick 28, or left-travel, right-travel, or swing motors 42L, 42R, 43), and a third circuit 82 selectively connecting a third pump 84 with a third hydraulic actuator (e.g., hydraulic cylinder 34 associated with work tool 14, or left-travel, right-travel, or swing motors 42L, 42R, 43). It is contemplated that hydraulic system 72 may include additional and/or different circuits or components, if desired, such as a charge circuit having one or more makeup valves, relief valves, pressure sources, and/or storage devices; pressure-compensating valves; and other circuits or valves known in the art.

First circuit 74 may include multiple different passages that fluidly connect first pump 76 to the first hydraulic actuator and, in some configurations, to the other actuators of machine 10 in a parallel, closed-loop manner. For example, first pump 76 may be connected to the first hydraulic actuator via a discharge passage 86, an intake passage 88, a head-end passage 90, and a rod-end passage 92. A first switching valve 94 may be disposed between discharge and intake passages 86, 88 and head- and rod-end passages 90, 92 to control fluid flow direction through first circuit 74. A first check valve 96 may be disposed within discharge passage 86 to help ensure a unidirectional flow of fluid through first pump 76.

First switching valve 94 may include a pilot-operated spool element 98 movable between three positions. When spool element 98 is in the first position (right-most position shown in FIG. 2), discharge passage 86 may be fluidly connected with head-end passage 90, while intake passage 88 may be fluidly connected with rod-end passage 92 such that fluid from first pump 76 flows through the first hydraulic actuator in a first direction causing the first hydraulic actuator to move in a first direction (e.g., in an extending direction). When spool element 98 is in the second position (middle position shown in FIG. 2), discharge passage 86 may be fluidly connected with intake passage 88 such that the fluid within first circuit 74 (e.g., from first pump 76) bypasses the first hydraulic actuator (i.e., such that the first hydraulic actuator is substantially isolated from first pump 76). When spool element 98 is in the third position (left-most position shown in FIG. 2), discharge passage 86 may be fluidly connected with rod-end passage 92, while intake passage 88 may be fluidly connected with head-end passage 90 such that fluid from first pump 76 flows through the first hydraulic actuator in a second direction opposite the first direction causing the first hydraulic actuator to move in a second direction (e.g., in a retracting direction).

Spool element 98 may be spring-biased to the second position and pilot-operated to move to any position between the first, second, and third positions, such that some fluid from first pump 76 may flow through the first hydraulic actuator in a particular direction, while the remaining fluid from first pump 76 may bypass the first hydraulic actuator. When spool element 98 is in a position between the first and second positions or between the second and third positions (i.e., in an in-between position), an operator of machine 10 may experience what is commonly known as an "open-center" feel associated with control of the first hydraulic actuator. That is, when the operator causes movement of spool element 98 to an in-between position, the first hydraulic actuator may be caused to move until a load on work tool 14 equals a force generated on the first hydraulic actuator by fluid from first pump 76, at which time the first hydraulic actuator may stop moving. To then cause the first hydraulic actuator to continue movement, the operator would be required to cause spool element 98 to move further towards one of the first and third positions. The "open-center" feel may provide enhanced control for the operator over work tool 14.

Second circuit 78 may include multiple different passages that fluidly connect second pump 80 to the second hydraulic actuator and, in some configurations, to the other actuators of machine 10 in a parallel, closed-loop manner. For example, second pump 80 may be connected to the second hydraulic actuator via a discharge passage 100, an intake passage 102, a head-end passage 104, and a rod-end passage 106. A second switching valve 107 may be disposed between discharge and intake passages 100, 102 and head- and rod-end passages 104, 106 to control fluid flow direction through second circuit 78. A second check valve 108 may be disposed within discharge passage 100 to help ensure a unidirectional flow of fluid through second pump 80.

Second switching valve 107 may be substantially identical to first switching valve 94, and include a pilot-operated spool element 110 movable between three positions. When spool element 110 is in the first position (left-most position shown in FIG. 2), discharge passage 100 may be fluidly connected with head-end passage 104, while intake passage 102 may be fluidly connected with rod-end passage 106 such that fluid from second pump 80 flows through the second hydraulic actuator in a first direction causing the second hydraulic actuator to move in a first direction (e.g., in an extending direction). When spool element 110 is in the second position (middle position shown in FIG. 2), discharge passage 100 may be fluidly connected with intake passage 102 such that the fluid within second circuit 78 (e.g., from second pump 80) bypasses the second hydraulic actuator (i.e., such that the second hydraulic actuator is substantially isolated from second pump 80). When spool element 110 is in the third position (right-most position shown in FIG. 2), discharge passage 100 may be fluidly connected with rod-end passage 106, while intake passage 102 may be fluidly connected with head-end passage 104 such that fluid from second pump 80 flows through the second hydraulic actuator in a second direction opposite the first causing the second hydraulic actuator to move in a second direction (e.g., in a retracting direction). Spool element 110 may be substantially identical to spool element 98.

Third circuit 82 may include multiple different passages that fluidly connect third pump 84 to the third hydraulic actuator and, in some configurations, to the other actuators of machine 10 in a parallel, closed-loop manner. For example, third pump 84 may be connected to the third hydraulic actuator via a discharge passage 114, an intake passage 115, a head-end passage 117, and a rod-end passage 119. A third switching valve 121 may be disposed between discharge and intake passages 114, 115 and head- and rod-end passages 117, 119 to control fluid flow through third circuit 82. A third check valve 124 may be disposed within discharge passage 114 to help ensure a unidirectional flow of fluid through third pump 84.

Third switching valve 121 may be substantially identical to first and second switching valves 94, 107, and include a pilot-operated spool element 125 movable between three positions. When spool element 125 is in the first position (left-most position shown in FIG. 2), discharge passage 114 may be fluidly connected with head-end passage 117, while intake passage 115 may be fluidly connected with rod-end passage 119 such that fluid from third pump 84 flows through the third hydraulic actuator in a first direction causing the third hydraulic actuator to move in a first direction (e.g., in an extending direction). When spool element 125 is in the second position (middle position shown in FIG. 2), discharge passage 114 may be fluidly connected with intake passage 115 such that the fluid within third circuit 82 (e.g., from third pump 84) bypasses the third hydraulic actuator (i.e., such that the third hydraulic actuator is substantially isolated from third pump 84). When spool element 125 is in the third position (right-most position shown in FIG. 2), discharge passage 114 may be fluidly connected with rod-end passage 119, while intake passage 115 may be fluidly connected with head-end passage 117 such that fluid from third pump 84 flows through the third hydraulic actuator in a second direction opposite the first causing the third hydraulic actuator to move in a second direction (e.g., in a retracting direction). Spool element 125 may be substantially identical to spool elements 98 and 110.

Third circuit 82 may also include a selector valve 122 that selectively connects third pump 84 to first circuit 74 or to second circuit 78. Selector valve 122, like first, second, and third switching valves 94, 107, 121, may be a three-position, four-way valve having a spool element 134. When spool element 134 is in the first position (left-most position shown in FIG. 2), intake passage 115 may be fluidly connected with head-end passage 90 of first circuit 74 via a first circuit passage 116, such that fluid passing through selector valve 122 (i.e., fluid either discharging from the third hydraulic actuator or discharging from third pump 84 and bypassing the third hydraulic actuator) is allowed to supplement the fluid from first circuit 74 entering first chamber 52 of the first hydraulic actuator. When spool element 134 is in the second position (middle position shown in FIG. 2), intake passage 115 may be fluidly connected with the intake of third pump 84 via a return passage 127, such that fluid passing through third selector valve 122 (i.e., fluid discharging from the third hydraulic actuator) is allowed to return directly to third pump 84. When spool element 134 is in the third position (right-most position shown in FIG. 2), intake passage 115 may be fluidly connected with head-end passage 104 of second circuit 78 via a second circuit passage 118, such that fluid passing through selector valve 122 (i.e., fluid either discharging from the third hydraulic actuator or discharging from third pump 84 and bypassing the third hydraulic actuator) is allowed to enter first chamber 52 of the second hydraulic actuator. Spool element 134 may be substantially identical to spool elements 98, 110, and 125.

Third pump 84 may be configured to draw fluid from one or both of first and second circuits 74, 78 (or alternatively or additionally from a charge circuit, if provided). Specifically, third pump 84 may be connected to intake passage 88 of first circuit 74 via a first intake passage 126, and connected to intake passage 102 of second circuit 78 via a second intake passage 128. A first isolation valve 130 may be disposed within first intake passage 126, while a second isolation valve 132 may be disposed within second intake passage 128. First and second isolation valves 130, 132, in the disclosed embodiment, are shown as check valves. It is contemplated, however, that first and/or second isolation valves 130, 132 could alternatively embody two-position (i.e., flow-passing, flow-blocking) solenoid-operated valves, if desired. In yet another embodiment, first and second isolation valves 130, 132 could be replaced with a single spool valve similar to switching valve 122, if desired.

First, second, and third pumps 76, 80, 84 may each be substantially identical variable-displacement type pumps that are controlled to draw fluid from the actuators of machine 10 and discharge the fluid at a specified elevated pressure back to the actuators in a single direction (i.e., pumps 76, 80, 84 may be unidirectional pumps). Pumps 76, 80, 84 may each include a stroke-adjusting mechanism, for example a swashplate, a position of which is hydro-mechanically adjusted based on, among other things, a desired speed of the actuators to thereby vary an output (e.g., a discharge rate). The displacement of pumps 76, 80, 84 may be adjusted from a zero displacement position at which substantially no fluid is discharged, to a maximum displacement position at which fluid is discharged at a maximum rate into discharge passages 86, 100, 114, respectively. Pumps 76, 80, 84 may be drivably connected to power source 18 of machine 10 by, for example, a countershaft, a belt, or in another suitable manner. Alternatively, pumps 76, 80, 84 may be indirectly connected to power source 18 via a torque converter, a gear box, an electrical circuit, or in any other manner known in the art. It is contemplated that pumps 76, 80, 84 may be connected to power source 18 in tandem (e.g., via the same shaft) or in parallel (e.g., via a gear train), as desired.

During operation of machine 10, the operator may utilize interface device 46 to provide a signal that identifies a desired movement of the various linear and/or rotary actuators to a controller 140. Based upon one or more signals, including the signal from interface device 46 and, for example, signals from various pressure sensors (not shown) and/or position sensors (not shown) located throughout hydraulic system 72, controller 140 may command movement of the different valves and/or displacement changes of the different pumps and motors to advance a particular one or more of the linear and/or rotary actuators to a desired position in a desired manner (e.g., at a desired speed and/or with a desired force).

Controller 140 may embody a single microprocessor or multiple microprocessors that include components for controlling operations of hydraulic system 72 based on input from an operator of machine 10 and based on sensed or other known operational parameters. Numerous commercially available microprocessors can be configured to perform the functions of controller 140. It should be appreciated that controller 140 could readily be embodied in a general machine microprocessor capable of controlling numerous machine functions. Controller 140 may include a memory, a secondary storage device, a processor, and any other components for running an application. Various other circuits may be associated with controller 140 such as power supply circuitry, signal conditioning circuitry, solenoid driver circuitry, and other types of circuitry.

Figure 3:
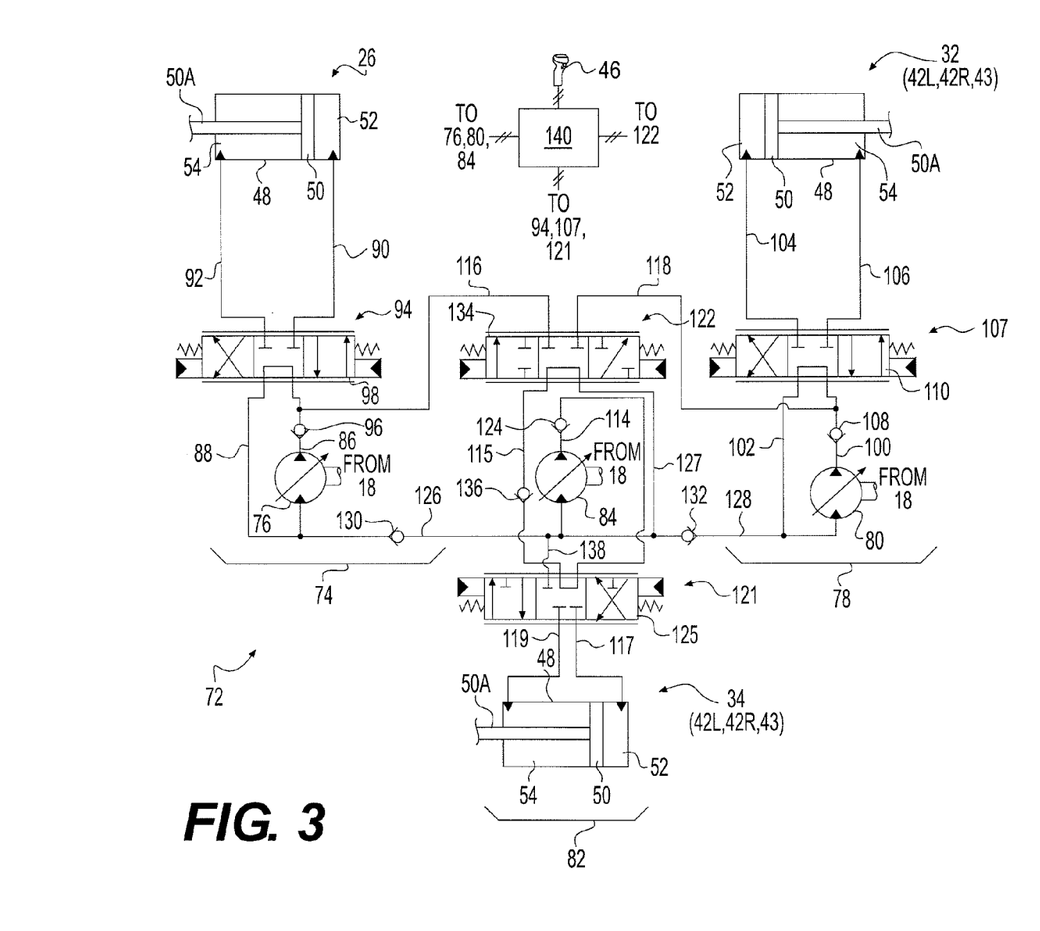
FIG. 3 is a schematic illustration of another exemplary disclosed hydraulic system that may be used in conjunction with the machine of FIG. 1.

FIG. 3 illustrates an alternative embodiment of hydraulic system 72. Like the embodiment of FIG. 2, hydraulic system 72 of FIG. 3 includes first, second, and third circuits 74, 78, 82 that direct fluid from first, second, and third pumps 76, 80, 84 to the first, second, and third actuators, respectively. In contrast to FIG. 2, however, third switching valve 121 is shown in the embodiment of FIG. 3 as a five-way valve. That is, pilot element 125 may be movable from a first position (left-most position shown in FIG. 2) at which discharge passage 114 may be fluidly connected with head-end passage 117, while rod-end passage 119 may be fluidly connected with first and second intake passages 126, 128 via a return passage 138 such that fluid from third pump 84 flows through the third hydraulic actuator in a first direction causing the third hydraulic actuator to move in a first direction (e.g., in an extending direction). When spool element 125 is in the second position (middle position shown in FIG. 2), discharge passage 114 may be fluidly connected with intake passage 115 such that the fluid within third circuit 82 (e.g., from third pump 84) bypasses the third hydraulic actuator (i.e., such that the third hydraulic actuator is substantially isolated from third pump 84). When spool element 125 is in the third position (right-most position shown in FIG. 2), discharge passage 114 may be fluidly connected with rod-end passage 119, while head-end passage 117 may be fluidly connected with first and second intake passages 126, 128 via return passage 138 such that fluid from third pump 84 flows through the third hydraulic actuator in a second direction opposite the first causing the third hydraulic actuator to move in a second direction (e.g., in a retracting direction). In this configuration, fluid passing through the third hydraulic actuator may return to third pump 84, instead of being directed to selector valve 122 for redistribution within first or second circuits 74, 78.

In addition, first circuit passage 116 may terminate at discharge passage 86 at a location downstream of check valve 96, while second circuit passage 118 may terminate at discharge passage 100 at a location downstream of check valve 108. This termination location may allow for fluid from third circuit 82 to be used within either of head- or rod-ends 52, 54 of the first or second hydraulic actuators, as desired. In addition, a check valve 136 may be disposed within intake passage 115 to help ensure a unidirectional flow of fluid through intake passage 115 and inhibit reverse moving shock waves from affecting operation of the third actuator and or third pump 84.

INDUSTRIAL APPLICABILITY

The disclosed hydraulic system may be applicable to any machine where improved hydraulic efficiency is desired. The disclosed hydraulic system may provide for improved efficiency through the selective use of closed-loop technology, flow-sharing, and flow-combining. Operation of hydraulic system 72 will now be described.

During operation of machine 10, an operator located within station 20 may command a particular motion of work tool 14 in a desired direction and at a desired velocity by way of interface device 46. One or more corresponding signals generated by interface device 46 may be provided to controller 140 indicative of the desired motion, along with machine performance information, for example sensor data such as pressure data, position data, speed data, pump or motor displacement data, and other data known in the art.

For example, in response to the signals from interface device 46 indicative of a desire to lift boom 22, and based on the machine performance information, controller 140 may generate control signals directed to the stroke-adjusting mechanism of first pump 76 and/or to first switching valve 94. To drive the first hydraulic actuator (e.g., hydraulic cylinders 26) at an increasing speed in an extending direction (e.g., to raise boom 22), controller 140 may generate a control signal that causes first pump 76 of first circuit 74 to increase its displacement and discharge pressurized fluid into discharge passage 86 at a greater rate and/or a control signal that causes spool element 98 of first switching valve 94 to move toward its first position. As described above, when spool element 98 moves toward its first position, discharge passage 86 may be increasingly fluidly communicated with head-end passage 90 and rod-end passage 92 may be increasingly fluidly communicated with intake passage 88. When fluid from first pump 76 is directed into first chamber 52, return fluid from second chamber 54 of the first hydraulic actuator and/or from the other linear or rotary actuators of first circuit 74 may flow back into first pump 76 in closed-loop manner. First isolation valve 130 may be in its flow-blocking position during normal extensions of the first hydraulic actuator. Extension of the second and third hydraulic actuators shown in FIG. 2 may be initiated in a similar manner.

To drive the first hydraulic actuator at an increasing speed in a retracting direction (e.g., to lower boom 22), controller 140 may generate a control signal that causes first pump 76 of first circuit 74 to increase its displacement and discharge pressurized fluid into discharge passage 86 at a greater rate and/or a control signal that causes spool element 98 of first switching valve 94 to move toward the third position. As described above, when spool element 98 moves toward the third position, discharge passage 86 may be increasingly fluidly communicated with rod-end passage 92 and head-end passage 90 may be increasingly fluidly communicated with intake passage 88. When fluid from first pump 76 is directed into second chamber 54, return fluid from first chamber 52 of the first hydraulic actuator and/or from the other linear or rotary actuators of first circuit 74 may flow back into first pump 76 in closed-loop manner. First isolation valve 130 may be in its flow-blocking position during normal retractions of the first hydraulic actuator. Retraction of the second and third hydraulic actuators shown in FIG. 2 may be initiated in a similar manner.

During normal extensions of the first or second hydraulic actuators, more fluid may be required within the respective head-end passages 90, 104, than can be supplied by first and second pumps 76, 80 into first and second discharge passages 86, 100. That is, the respective rates of fluid flow into and out of the hydraulic actuators (if embodied as linear actuators) during extension and retraction may not be equal. In particular, because of the location of rod portion 50A within second chamber 54, piston assembly 50 may have a reduced pressure area within second chamber 54, as compared with a pressure area within first chamber 52. Accordingly, during retraction of the hydraulic actuators, more fluid may be forced out of first chamber 52 than can be consumed by second chamber 54 and, during extension, more hydraulic fluid may be consumed by first chamber 52 than is forced out of second chamber 54. In order to accommodate the additional fluid required during extension, the output of third pump 84 may be selectively directed into first and second circuits 74, 78.

For example, during extension of the first hydraulic actuator shown in FIG. 2, controller 140 may generate a control signal that causes third pump 84 of third circuit 82 to increase its displacement and discharge pressurized fluid into discharge passage 114 at a greater rate, and/or a control signal that causes spool element 134 of selector valve 122 to move toward the first position. As described above, when spool element 134 moves toward the first position, intake passage 115 may be increasingly fluidly communicated with first-circuit passage 116 such that fluid flows from third circuit 82 into first circuit 74 at a greater rate. When fluid from third pump 84 is directed into first circuit 74, makeup fluid may be supplied to third pump 84 either from a charge circuit (not shown), from second circuit 78 during extension of the first actuator, and/or from first circuit 74 during retraction of the first actuator, as conditions allow (e.g., from second circuit 78 during retraction of the second hydraulic actuator, otherwise from the charge circuit).

During extension of the second hydraulic actuator shown in FIG. 2, controller 140 may generate a control signal that causes third pump 84 of third circuit 82 to increase its displacement and discharge pressurized fluid into discharge passage 114 at a greater rate and/or a control signal that causes spool element 134 of selector valve 122 to move toward the third position. As described above, when spool element 134 moves toward the third position, discharge passage 114 may be increasingly fluidly communicated with second-circuit passage 118 such that fluid flows from third circuit 82 into second circuit 78 at a greater rate. When fluid from third pump 84 is directed into second circuit 78, makeup fluid may be supplied to third pump 84 either from a charge circuit (not shown), from first circuit 74 during extension of the second actuator, and/or from second circuit 78 during retraction of the second actuator, as conditions allow.

Third switching valve 121 may be modulated during extension of the first and/or second hydraulic actuators depending on whether operation of the third hydraulic actuator is simultaneously requested by the operator. For example, if during extension of the first hydraulic actuator, the operator simultaneously requests work tool 14 to curl, controller 140 may move spool element 125 toward its first position, such that fluid from third pump 84 flows into first chamber 52 of the third hydraulic actuator at a greater rate. At this same time, fluid being discharged from second chamber 54 of the third hydraulic actuator may be caused to flow through intake passage 115 and selector valve 122 into first circuit passage 116, as described above. If during extension of the third hydraulic actuator, however, the operator does not request simultaneous curling of work tool 14, spool element 125 of third switching valve 121 may be maintained in the second position such that the pressurized fluid from third pump 84 bypasses the third hydraulic actuator and flows directly to first circuit 74 via third switching valve 121, intake passage 115, selector valve 122, and first circuit passage 116. Modulation of third switching valve 121 during extension of the second linear actuator may be substantially identical to modulation of third switching valve 121 during extension of the first linear actuator.

First and/or second circuits 74, 78 may also be configured to selectively direct fluid to third circuit 82 under particular conditions. For example, during retraction of the first hydraulic actuator, while first pump 76 is supplying pressurized fluid to second chamber 54, first chamber 52 may be discharging fluid in excess of the amount being drawn into first pump 76. At this time, the excess fluid may be directed to third pump 84 via first intake passage 126. At this time, first isolation valve 130 may moved to its flow-passing position and second isolation valve 132 may be maintained in its flow-blocking position. This fluid, particularly if highly-pressurized (as may be the case during an overrunning condition), may help reduce the power consumption of third pump 84 and/or even be used to drive third pump 84 as a motor to return energy back to power source 18. The discharge of excess fluid from second circuit 78 may function in a similar manner.

It may be possible in some situations for first circuit 74 to discharge fluid to third circuit 82 at the same time that third circuit 82 is discharging fluid to second circuit 78. In this situation, when the fluid demand from second circuit 78 is less than the fluid supplied to third circuit 82 by first circuit 74, the excess fluid may be directed through a relief valve (not shown) into a charge circuit (not shown). A similar situation may occur during discharge of fluid from second circuit 78 to third circuit 82.

In the disclosed hydraulic system, flows provided by the different pumps may be substantially unrestricted during modulation of the associated hydraulic actuators such that significant energy is not unnecessarily wasted in the actuation process. Thus, embodiments of the disclosure may provide improved energy usage and conservation. In addition, the closed-loop meterless operation of hydraulic system 72 may, in some applications, allow for a reduction or even complete elimination of metering valves for controlling fluid flow associated with the linear and rotary actuators. This reduction may result in a less complicated and/or less expensive system.

The disclosed hydraulic system may also allow for priority-based flow sharing between circuits. In particular, the disclosed system may allow for flow from third circuit 82 to be shared with first and/or second circuits 74, 78, as needed (e.g., during extension of the first and/or second hydraulic actuators). This ability to share flows between closed-loop circuits may allow an associated charge circuit to have reduced capacity, thereby reducing a size and/or cost of the charge circuit. In addition, third switching valve 121 may allow the third hydraulic actuator to have flow priority over the first and second hydraulic actuators during flow-sharing. That is, third switching valve 121 may allow for the flow from third pump 84 to either be first directed through the third hydraulic actuator (when movement of the third hydraulic actuator is simultaneously requested by the operator) or to be directed to bypass the third hydraulic actuator (when movement of the third hydraulic actuator is not requested). This ability may enhance control of machine 10, while still providing for the flow demands of the different circuits.

It will be apparent to those skilled in the art that various modifications and variations can be made to the disclosed hydraulic system. Other embodiments will be apparent to those skilled in the art from consideration of the specification and practice of the disclosed hydraulic system. For example, it is contemplated that switching valves 94, 107, and/or 122 may embody non-spool type valves and/or non-pilot operated types of valves, if desired. For example, direct solenoid operated valves having poppet-type elements may be utilized. It is intended that the specification and examples be considered as exemplary only, with a true scope being indicated by the following claims and their equivalents.

What is claimed is:

1. A hydraulic system, comprising:
   a first pump;
   a second pump;
   a third pump;
   a first actuator connected to the first pump in closed-loop manner;
   a second actuator connected to the second pump in closed-loop manner;
   a third actuator;
   a selector valve associated with the third pump; and
   a first switching valve associated with the third pump and the third actuator,
   wherein the first switching valve is movable between a first position at which the third pump is connected to the third actuator in a closed-loop manner to move the third actuator in a first direction, a second position at which the third pump is connected to the third actuator in a closed-loop manner to move the third actuator in a second direction, and a third position at which the third pump is connected to the selector valve.

2. The hydraulic system of claim 1, wherein the selector valve is movable between a first position at which the third pump is connected to the first actuator in a closed-loop manner, a second position at which the third pump is connected to the second actuator, and a third position at which an output of the third pump is connected to an input of the third pump.

3. The hydraulic system of claim 2, wherein when the first switching valve is in the third position, the third actuator is substantially isolated from the third pump and from the selector valve.

4. The hydraulic system of claim 3, wherein when the first switching valve is in the first or second positions, fluid discharged from the third actuator is fluidly communicated with the selector valve.

5. The hydraulic system of claim 2, wherein the third pump is connectable to only head-ends of the first and second actuators via the selector and first switching valves.

6. The hydraulic system of claim 2, further including:
   a first return passage configured to allow excess fluid from the first actuator to return to the third pump; and
   a second return passage configured to allow excess fluid from the second actuator to return to the third pump.

7. The hydraulic system of claim 6, further including:
   a first check valve disposed within the first return passage; and
   a second check valve disposed within the second return passage.

8. The hydraulic system of claim 2, wherein each of the selector and first switching valves are configured to move to any position between the first, second, and third positions.

9. The hydraulic system of claim 2, wherein each of the selector and first switching valves are four-way, pilot operated valves.

10. The hydraulic system of claim 2, further including:
    a second switching valve movable between a first position at which the first pump is connected to the first actuator in a closed-loop manner to move the first actuator in a first direction, a second position at which the first pump is connected to the first actuator in a closed-loop manner to move the first actuator in a second direction, and a third position at which the first pump is substantially isolated from the first actuator; and
    a third switching valve movable between a first position at which the second pump is connected to the second actuator in a closed-loop manner to move the second actuator in a first direction, a second position at which the second pump is connected to the second actuator in a closed-loop manner to move the second actuator in a second direction, and a third position at which the second pump is substantially isolated from the second actuator.

11. The hydraulic system of claim 10, wherein each of the second and third switching valves are four-way, pilot operated valves configured to move to any position between the first, second, and third positions.

12. The hydraulic system of claim 11, wherein each of the first, second, and third pumps are unidirectional variable-displacement pumps.

13. The hydraulic system of claim 2, wherein the first, second, and third actuators are linear actuators.

14. The hydraulic system of claim 13, wherein:
the first actuator is a boom actuator;
the second actuator is stick actuator; and
the third actuator is a tool actuator.

15. A hydraulic system, comprising:
a unidirectional variable-displacement first pump;
a unidirectional variable-displacement second pump;
a unidirectional variable-displacement third pump;
a boom actuator connected to the first pump in closed-loop manner;
a stick actuator connected to the second pump in closed-loop manner;
a tool actuator;
a selector valve movable between a first position at which the third pump is connected to the boom actuator in a closed-loop manner, a second position at which the third pump is connected to the stick actuator, and a third position at which an output of the third pump is connected to an input of the third pump;
a first switching valve associated with the third pump and the tool actuator, the first switching valve being movable between a first position at which the third pump is connected to the tool actuator in a closed-loop manner to move the tool actuator in a first direction, a second position at which the third pump is connected to the tool actuator in a closed-loop manner to move the tool actuator in a second direction, and a third position at which the third pump is connected to the selector valve;
a second switching valve movable between a first position at which the first pump is connected to the boom actuator in a closed-loop manner to move the boom actuator in a first direction, a second position at which the first pump is connected to the boom actuator in a closed-loop manner to move the boom actuator in a second direction, and a third position at which the first pump is substantially isolated from the boom actuator; and
a third switching valve movable between a first position at which the second pump is connected to the stick actuator in a closed-loop manner to move the stick actuator in a first direction, a second position at which the second pump is connected to the stick actuator in a closed-loop manner to move the stick actuator in a second direction, and a third position at which the second pump is substantially isolated from the stick actuator,
wherein:
when the first switching valve is in the third position, the tool actuator is substantially isolated from the third pump and from the selector valve; and
when the first switching valve is in the first or second positions, fluid discharged from the tool actuator is fluidly communicated with the selector valve.

16. A method of operating a hydraulic system, comprising:
pressurizing fluid with a first pump;
directing pressurized fluid from the first pump to a first actuator via a closed-loop first circuit;
pressurizing fluid with a second pump;
directing pressurized fluid from the second pump to a second actuator via a closed-loop second circuit;
pressurizing fluid with a third pump; and
selectively directing pressurized fluid from the third pump through a third actuator to the first or second circuits via a closed-loop third circuit, or directing pressurized fluid from the third pump to bypass the third actuator and enter the first or second circuits via the third circuit.

17. The method of claim 16, further including selectively directing fluid from the first and second circuits to the third pump.

18. The method of claim 16, further including selectively directing fluid from the third actuator to bypass the first and second circuits and return to the third pump.

19. The method of claim 16, wherein directing pressurized fluid from the third pump to bypass the third actuator includes isolating the third actuator from the third pump and from the first and second circuits.

20. The method of claim 16, wherein directing pressurized fluid from the third pump to bypass the third actuator and enter the first and second circuits includes directing pressurized fluid to enter only head-ends of the first and second actuators.

* * * * *